United States Patent [19]
Fischer

[11] 3,847,289
[45] Nov. 12, 1974

[54] DEVICE FOR THE REMOVAL OF BULK MATERIAL FROM ROUND, CONE-SHAPED PILES

[75] Inventor: Gerhard Fischer, Dortmund-Kirchhorde, Germany

[73] Assignee: Gustav Schade Maschinenfabrik, Dortmund, Germany

[22] Filed: June 22, 1973

[21] Appl. No.: 372,480

[30] Foreign Application Priority Data
June 26, 1972  Germany.............................. 2231268

[52] U.S. Cl.................... 214/10, 198/36, 214/16 R
[51] Int. Cl.............................................. B65g 65/28
[58] Field of Search..... 214/10, 16 R, 17 D, 17 DB; 198/36

[56] References Cited
UNITED STATES PATENTS
| | | | |
|---|---|---|---|
| 3,509,985 | 5/1970 | Fischer | 214/10 X |
| 3,557,934 | 1/1971 | Schade | 214/10 X |

FOREIGN PATENTS OR APPLICATIONS
| | | | |
|---|---|---|---|
| 56,721 | 6/1967 | Germany | 198/36 |
| 1,243,569 | 9/1960 | France | 214/10 |

Primary Examiner—Frank E. Werner

[57] ABSTRACT

A device is disclosed for removing bulk material from a circular pile to a discharge opening located in the supporting surface beneath the pile and generally in the center thereof. The removing device includes a scraper in the form of an endless belt supported adjacent the outer surface of the pile. The scraper is rotatable about the pile and the axis of the discharge opening, and the lower end of the scraper is supported for pivotal movement of the scraper in a vertical plane between positions in which the scraper is inclined relative to the supporting surface and generally parallel and adjacent to the supporting surface. In operation, the endless belt engages the outer surface of the pile of material and displaces the material upwardly of the pile to the upper peak thereof for flow of the material downwardly from the peak toward the discharge opening. As the scraper rotates around the pile it is pivoted downwardly so as to maintain contact with the material in the pile, whereby the material is progressively displaced from the pile for flow through the discharge opening.

13 Claims, 7 Drawing Figures

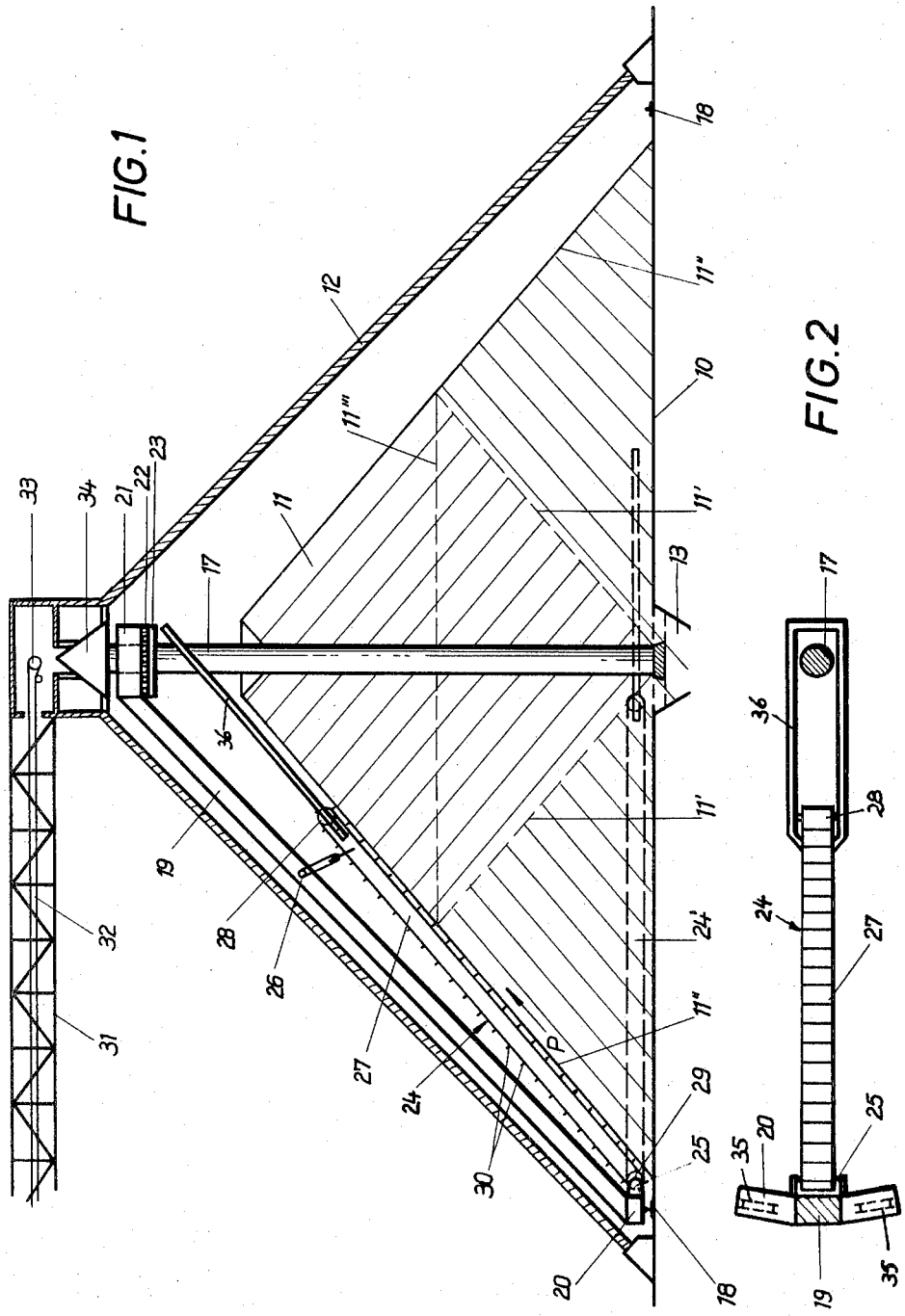

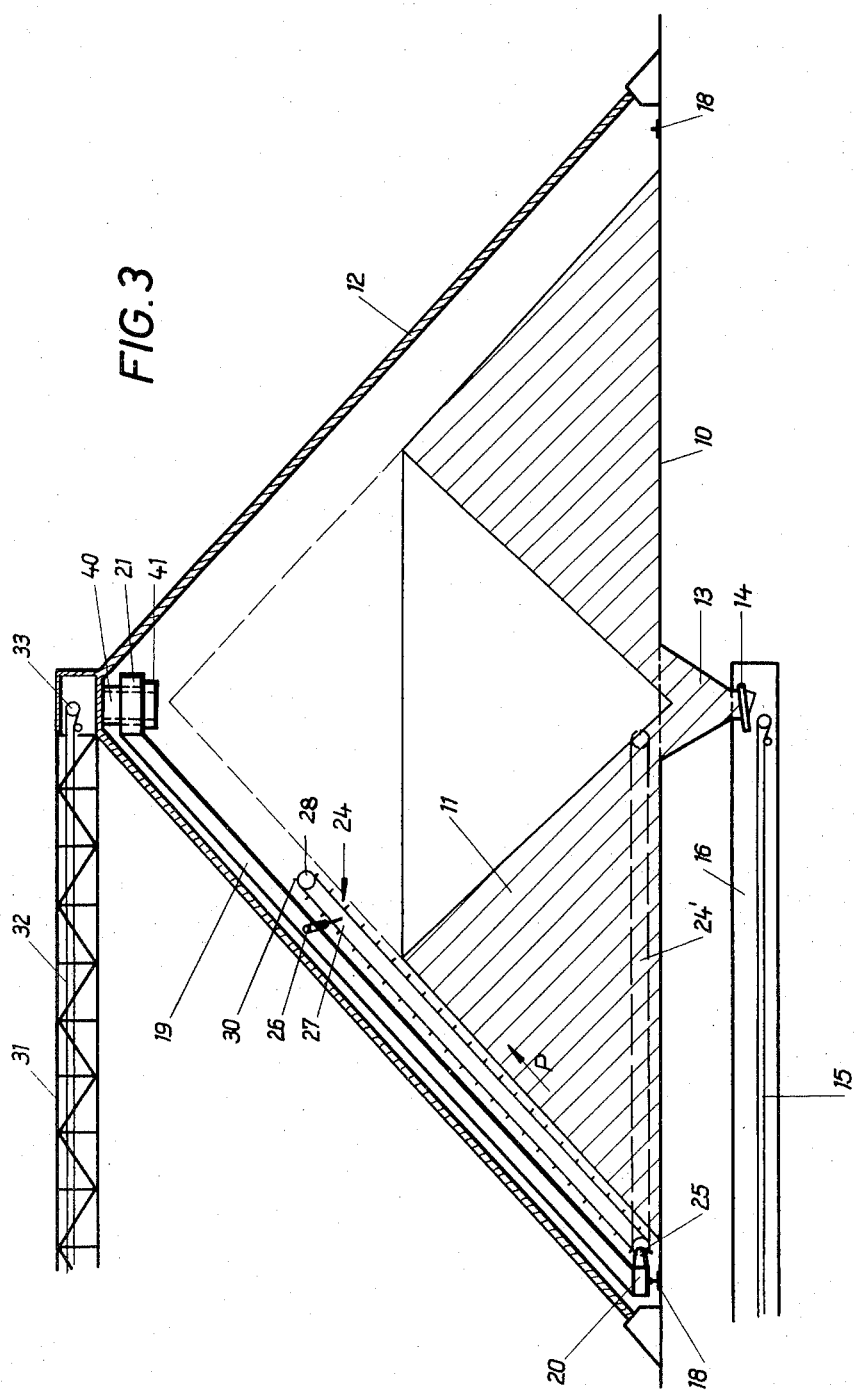

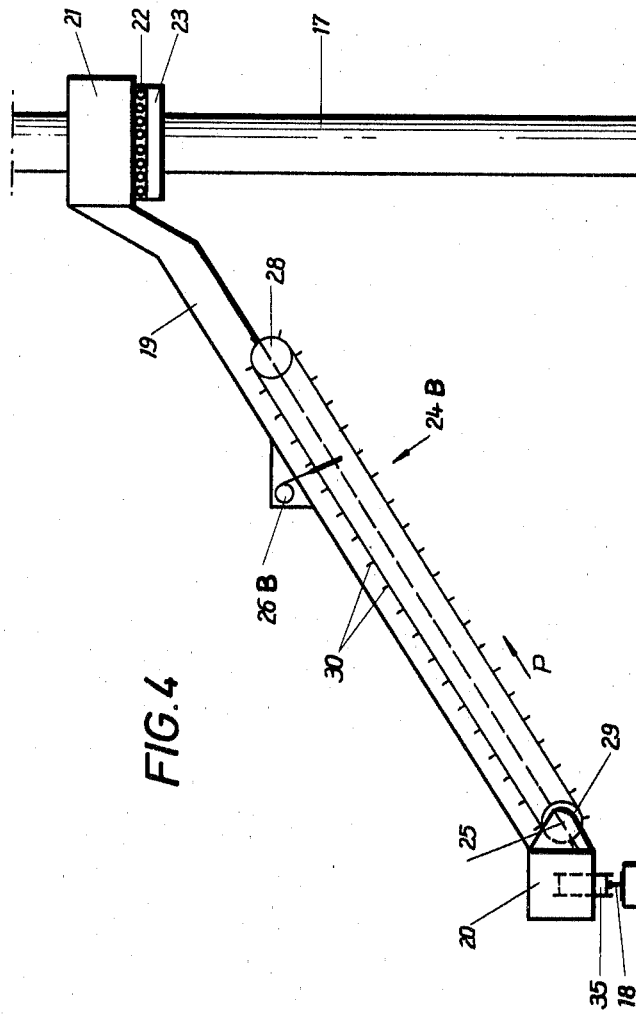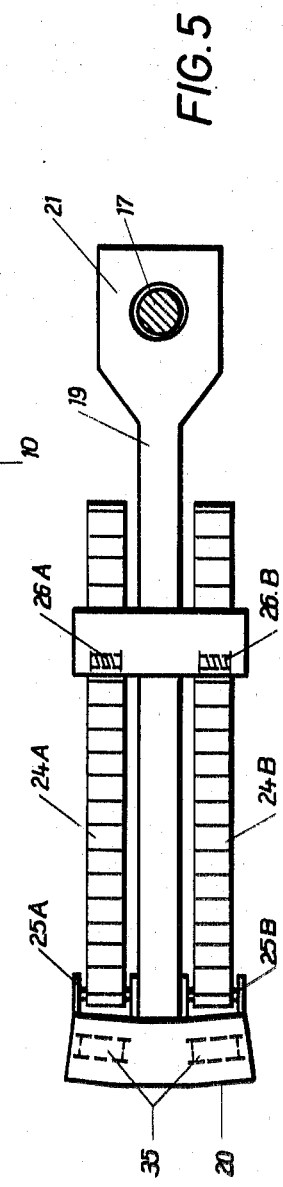

DEVICE FOR THE REMOVAL OF BULK MATERIAL FROM ROUND, CONE-SHAPED PILES

The invention is concerned with a device for the removal of bulk material from round, preferably cone-shaped dump piles. The device includes a raking scraper movable around the center of the dump pile and which has at least one scraper boom, pivotally raisable and lowerable in a vertical plane and operable to deliver bulk material to be removed from the pile to a discharge opening in the floor at the center of the dump pile.

For removal of bulk material in piles, scrapers of various constructions are known. Some prior scrapers have, on a traveling frame such as a gantry, one or several scraper booms, tiltable in the vertical plane. The employment of removal scrapers for the clearing of round or ring-shaped bulk material piles is also known. In such a setup, a vertical center post is usually arranged in the center of the dump pile. A removal scraper swivels around the center post during the removal operation. The removal scraper has a scraper boom, raisable and lowerable by means of a hoisting gear whose swivel bearing is setup in the center of the pile close to the center post. In the removal operation the scraper boom is lowered so far onto the inner slope of the ring-shaped pile that it scrapes the bulk material on this slope downwards carrying it to a funnel-shaped opening in the floor at the center of the dump pile.

The disadvantage of the latter device intended for the clearing of ring-shaped dump piles is to be seen mainly in the fact that the storage volume is relatively small in proportion to the required floor area and the enclosed space for the pile. It is in most cases not possible and in any case not practical to pile up the bulk material to the form of a cone, since the clearing device with the scraper boom would in this case be buried under the bulk material in the pile.

The present invention is particularly based on the task of producing a clearing device by which both cone-shaped piles and ring-shaped piles of bulk material can be economically stored and removed without the removal apparatus interfering with the storing operation or being buried under the stored bulk material.

The invention is characterized by an arrangement in which the removal scraper includes a scraper boom supported on the one hand by a lower circular guide rail laid out on the perimeter of the storage area close to the base of the dump pile and on the other hand by an upper center guide disposed above the pile and in its central area. The scraper boom is pivotal in a vertical plane about an axis disposed on the perimeter of the storage area close to the circular guide rail.

The removal scraper preferably includes a connecting beam swingable around the center of the dump pile, and having a lower end supported by the circular guide rail and an upper end supported by the center guide. At least one raisable and lowerable scraper boom is associated with the connecting beam. The connecting beam is suitably provided with a base carriage running with wheels on the circular guide rail, and the lower end of the scraper boom is pivotally connected to the base carriage. The scraper boom is raisable and lowerable vertically with respect to the connecting beam. The mentioned center guide can be formed by a center post in the dump pile. Alternatively, a central guide can be arranged according to the invention above the dump and suspended from a roof construction thereabove. In such a case it is preferred that the center guide be constructed as a hollow tubular body so that the bulk material to be stored can in this case be directly deposited on the dump pile through the hollow center guide.

With the removal equipment according to the present invention, round dump piles including those piled up to a cone can be removed in an extremely economical manner. A large portion of the material forming a conical pile can be directly removed through a funnel-shaped discharge opening in the floor at the center of the pile without assistance of the removal scraper, i.e., solely under the influence of gravity without any hindrance of the material flow to the discharge opening by the removal scraper. The pile still remaining after the inner core of the cone pile has been removed encircles as a ring the discharge opening in the floor, and the remaining portion can be cleared with the help of the removal scraper. In this respect, the scraper boom works on the outer slope of the ring-shaped pile, transporting the material upwards on the incline, so that it flows on the opposite slope, i.e., on the inner slope of the ring dump, toward the discharge opening in the floor. In this way it is possible to clear the dump completely down to the naked floor. The dumping can be carried out without encumbrance by the removal scraper and, above all, without burying the scraper boom in the piled material. In order to pile up the bulk material to form a conical pile, it is dumped above the center of the storage area. The material to be stored can be brought up in a known manner by means of a conveyor belt or by any other conveying apparatus.

The material removing apparatus can also be constructed in such a way that the connecting beam can be raised and lowered together with the scraper boom. The connecting beam has, in accordance with this aspect of the invention, a pivotal end at the base carriage and a support extension projecting beyond its end opposite the pivot end. The support extension is supported on laterally opposite sides of the center post by a raisable and lowerable swivel support on the post. The scraper boom is in this case laterally supported on both of its ends, whereby its bending stress under the influence of the horizontal forces appearing in the operation is reduced. In another particularly suitable arrangement, the scraper boom, has an extension disposed on opposite sides of the center port, and is suspended for vertical movement relative the connecting beam which is swingable around the center post. In accordance with still another aspect of the invention, the connecting beam can be completely omitted. The scraper boom is in this case supported with the help of its support extension on the swivel support on the center post, which, as mentioned above, is raisable and lowerable on the post. The connecting beam extension or the support extension of the scraper boom respectively is preferably constructed in the form of a fork or a frame in such a way that it embraces the central guide or the center post on both sides. In the case of a connecting beam lowerable with the scraper boom the latter can also be pivoted at the pivot axis for the connecting beam. Moreover, it is advisable to support the connecting beam extension or the support extension of the scraper boom respectively for longitudinal movement relative to the center post by means of rollers or the like on the swivel support on the center post itself. The swivel guide can be rotatably connected to a hoisting body surrounding the center post and raisable and lowerable along the center post by means of an elevating mechanism, such as a winch or the like.

The removal scraper can, as mentioned before, also be provided with several scraper booms, for instance two parallel scraper booms which are appropriately arranged side by side on both sides of the connecting beam.

It is an object of the present invention to provide a device for the efficient and expeditious removal of bulk material from a pile to a discharge opening.

A further object is the provision of a device of the foregoing character which is operable in a storage area adapted to receive bulk material in a conical pile without interference of the pile of material with operation of the removal device.

Another object is the provision of a device of the foregoing character which is operable to achieve removal of substantially all of the bulk material in a pile by progressive displacement of the material from the outer surface of the pile toward a discharge opening at the center of the pile.

Still another object is the provision of a device of the foregoing character which includes a scraper component having a lower end pivotally supported adjacent the outer edge of a circular pile of material so that the scraper member can be pivoted in a vertical plane to engage the outer surface of the pile and displace the material in the pile upwardly along the outer surface to the upper peak of the pile for flow therefrom toward the discharge opening at the center of the pile.

A further object is the provision of a device of the foregoing character in which the scraper component is rotatable about the outer surface of the pile so that the device is operable to progressively remove material from the pile as the scraper component moves about the periphery thereof.

Preferred embodiments of the invention are shown in the drawing, wherein:

FIG. 1 is a schematic elevation view of a device according to the present invention for the removal of material from a conical dump pile;

FIG. 2 is a plan view of the scraper boom of FIG. 1;

FIG. 3 is a schematic elevation view of another form of a device according to the invention;

FIG. 4 is a schematic elevation view of yet another form of a device according to the invention;

FIG. 5 is a plan view of the connecting beam and scraper boom of the device illustrated in FIG. 4;

Figure 6:
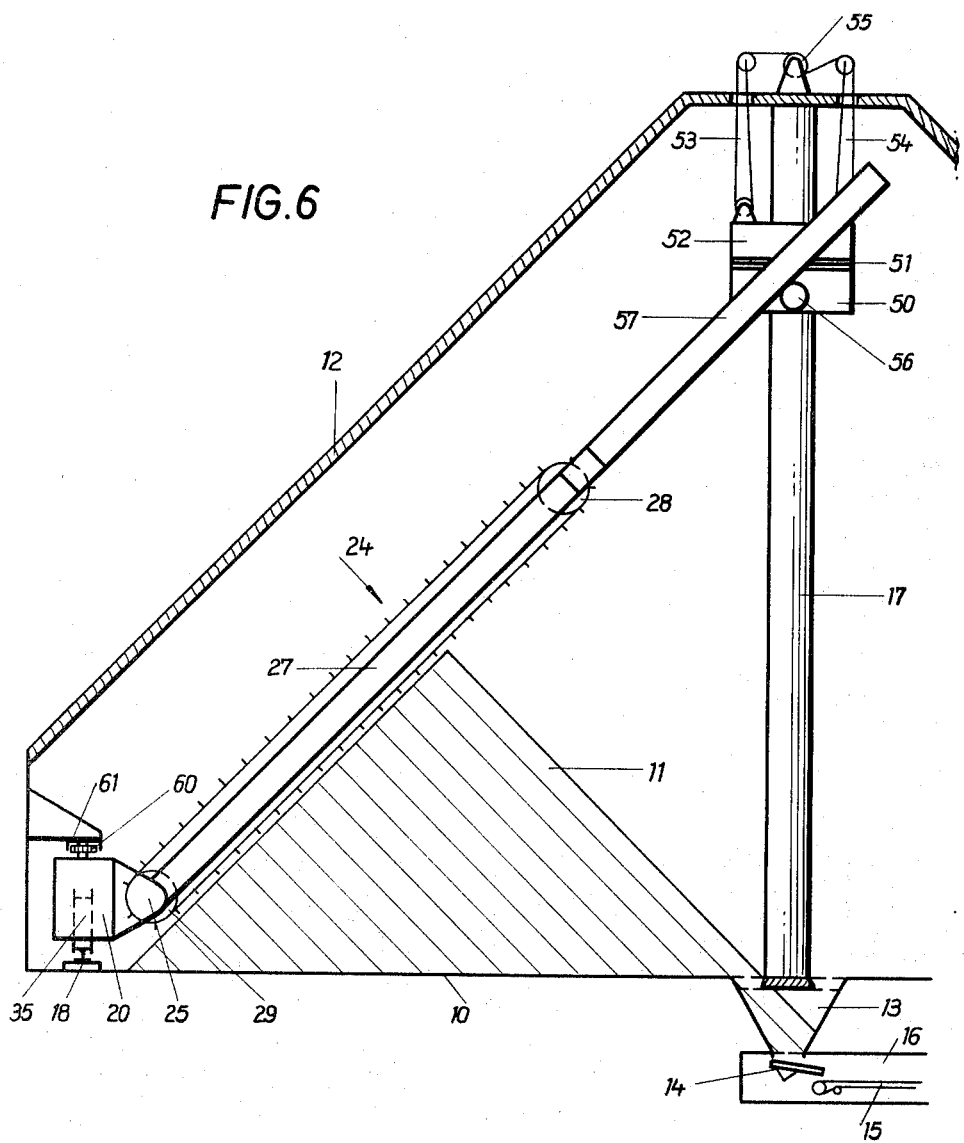
FIG. 6 is a partial schematic elevation view of yet another embodiment of the invention; and, FIG. 7 is a plan view of the scraper boom of the device illustrated in FIG. 6.

In the drawing 10 represents the base or floor beneath a conical pile of both material 11 in a storage hall. The roof construction 12 of the storage hall is also cone-shaped. In the center of the floor area is a funnel-shaped discharge opening 13. Underneath the funnel discharge of this discharge opening is a suitable drawing-off device, not illustrated, which may consist, for instance, of a vibrating trough and conveyor assembly operable to cause the discharge and carrying-off of measured quantities of the material in the pile.

A center post 17 extends from the discharge opening 13 to the apex of the roof construction. Center post 17 rests inside the discharge opening 13 on a crosspiece, for instance a star-Shaped supporting bracket or the like (not illustrated). The center post serves as a central guide for a removal scraper.

A circular guide rail 18 is provided on the floor of the storage hall and extends about the perimeter of the cone-shaped dump 11. Guide rail 18 is concentric with the center post and supports the removal scraper for rotation about the center post during the removal operation.

In the embodiment illustrated in FIG. 1, the removal scraper consists of a connecting beam 19 disposed approximately at the angle of repose of the dump pile. Beam 19 is supported at its lower end by the outer circular guide rail 18 and at its upper end by an upper central guidance assembly on the center post 17. The connecting beam is provided on its lower end with a base carriage 20 which by means of wheels 35, at least one of which is motor driven, runs on the rail 18. The connecting beam 19 has on its upper end a ring body 21 which encircles the center post 17 and rests by means of a rotary connection 22, for instance a roller bearing arrangement, on a ring-shaped bracket 23 which is fastened on the center post 17. The connecting beam 19 supported by the outer guide rail 18 and the upper central guidance is therefore swingable around the vertical axis of the center post with carriage 20 riding on the circular guide rail 18.

A scraper boom 24 is arranged on the connecting beam 19 and is pivoted in a swivel bearing 25 having a horizontal axis. The swivel bearing 25 is located on the base carriage 20 and therefore, on the periphery of the conical dump pile 11 near its base. The scraper boom 24 is, near to its free upper end, suspended on the connecting beam 19 by means of a hoisting unit 26, suitably a lifting winch with a block-and-tackle rope. With the help of the hoisting unit the boom can be lowered in a vertical plane down to the position 24' indicated by the broken line in FIG. 1 and raised again from this low position to the full line position. The scraper boom 24 includes a carrier 27, preferably a box girder of welded construction, which has on its ends drivable sprocket wheels 28 and 29 for endless link chains between which are connected appropriately spaced scraping rakes 30.

Above the storage hall is set up a conveyor bridge 31 with a conveyor belt 32 whose discharge end 33 lies in the center of the dump above the center post 17. Underneath the discharge end 33 is installed a taper chute 34 over which the material discharge by the conveyor belt 32 is laterally dumped on the dump heap past the ring body 21 and the center post 17. With the help of this dumping apparatus it becomes thus possible to build up around the center port 17 the conical pile 11 whose peak lies directly underneath the central guidance of the connecting beam 19.

The inner core of the conical dump heap can, in the removal operation, be drawn-off through the discharge opening 13 in the floor without the aid of the scraper boom 24 and solely under the influence of gravity by means of the activated vibrating trough or the like beneath opening 13. A ring-shaped pile concentrically encircling the center post 17 is thereby created whose inner ring slope is indicated in the FIG. 1 by the broken line 11'. This still remaining ring-shaped dump can then be removed with the help of the scraper boom 24. The scraper boom is for this purpose lowered by means of the hoisting gear 26 onto the outer ring slope 11'' of the dump, so that its scraping rakes on the underside of the belt penetrate with a predetermined cutting depth into the pile surface 11″ and thereby transport the bulk material upwards on the incline in the direction of the arrow P to the peak 11‴ of the ring-shaped pile. The bulk material arrives now, passing over the peak 11‴, on the inner slope 11′ and slides on it into the funnel-shaped discharge opening 13 from where it is drawn-off by the vibrating trough and there removed by the conveyor belt. The scraper boom 24 swings during the removal operation together with the connecting beam 19 around the vertical center axis of the center post 17. The scraper boom 24 is after each completed revolution gradually lowered until it reaches the fully lowered position 24′. The dump can in this manner be completely cleared. It will be appreciated that suitable drive motors and controls, not illustrated, are provided to achieve the necessary scraper belt, scraper boom and connecting beam movements.

Preferably, the scraper boom 24 is provided on its free end with a guiding extension 36 of a frame-like construction which embraces the center post 17 on both sides. By means of this guiding extension, which also can be constructed in the form of a fork, the scraper boom is thus during its rotating motion around the center post laterally propped against it. The guiding extension is rigidly fastened on the lateral surfaces of the girder 27.

The embodiment illustrated in FIG. 3 corresponds in many respects to the embodiment of FIG. 1 and, accordingly, like numerals are employed in FIG. 3 where appropriate. The embodiment of FIG. 3 differs from that according to the FIGS. 1 and 2 essentially only in that the center post 17 is omitted. Instead of such a center post arrangement a center guide 40 in the form of a trunnion is suspended from the roof construction 12. The connecting beam 19 of the clearing scraper encircles the center guide 40 and its ring body 21 is revolvable about the center guide 40 and is supported thereon by a terminal flange 41 or the like on guide 40. The scraper boom 24 has in this case no supporting extension.

The suspended center guide 40 consists suitably of a tubular hollow body. The feed conveyor belt 32 dumps the bulk material to be stored at its discharge point 33 into the hollow body, so that it drops, passing through it, onto the dump pile. Dumping and clearing are carried out in the same manner as with the form of execution according to FIGS. 1 and 2. The use of a suspended trunnion as center guide offers above all the advantage that the center post can be done away with. It will also be noted that FIG. 3 illustrates a drawing-off device 14 beneath opening 13, a conveyor belt 15 for material discharged through the opening, and a housing 16 for belt 15.

The embodiment illustrated in FIGS. 4 and 5 corresponds to a large extent to that according to FIGS. 1 and 2. Accordingly, like numerals are employed to designate like components. A center post 17 is provided above the discharge opening (not illustrated) in the floor 10. The center post forms a center guide for the connecting beam 19 of the removal scraper. The latter has track wheels 35 on its base carrier 20, and wheels 35 run on the guide rail 18. As can be recognized particularly from FIG. 5, two parallel scraper booms 24A and 24B of equal length are provided in this embodiment and are supported in a corresponding swivel bearing 25A and 25B. Accordingly, the booms 24A and 24B can be raised and lowered either individually or also jointly and, for this purpose there is provided hoisting units 26A and 26B, respectively. In the process of removing material it is advantageous to lower the scraper boom tracking the removal scraper in its traveling or swiveling direction by the additional cutting depth compared to the front-running scraper boom, so that both booms work on the slope of the pile and transport the material upwards on the slope in the direction of arrow P.

Figure 7:
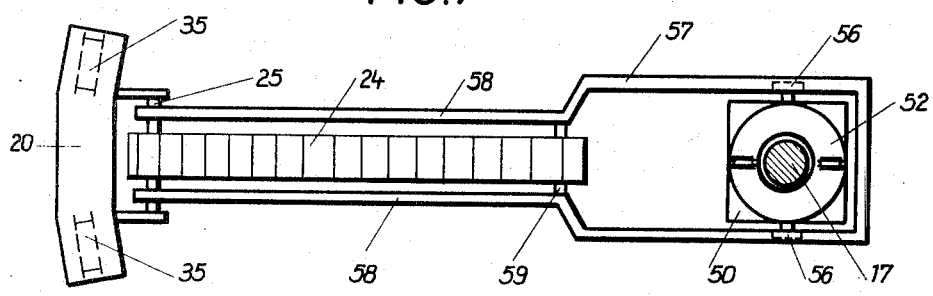

In the embodiment illustrated in FIGS. 6 and 7 a vertical center post is disposed in the center of the storage area over the funnel-shaped discharge opening 13 in the floor and extends to the apex of the roof construction 12. Underneath the roof construction a supporting body 50 rotatably surrounds center post 17 and is shiftable in the vertical direction of the post. Body 50 is rotatably interconnected such as by a bearing assembly 51 with a ring body 52 which, though raisable and lowerable on the center post, is suitably restrained against a rotary motion relative to the center post. Lifting and lowering of the ring body 52 and of the supporting body 50 rotatively connected with it is achieved by two block-and-tackle sets 53 and 54 and a hoisting gear 55 which is arranged on the top of the center post 17 above the peak of the roof construction.

Rolls 56 are rotatably mounted on laterally opposite sides of the supporting body 50. On these rolls 56 rests a guiding or supporting frame 57 which embraces the supporting body 50 and the ring body 52 along both sides. The supporting frame 57 has parallel beam like shanks 58 between which the scraper boom 24 is arranged. The beam like shanks 58 are together with the scraper boom 24 pivoted in one and the same swivel bearing 25. The scraper boom 24 is in the area of its free end firmly connected with the shanks 58 at 59.

With the help of the hoisting gear 55 and the block-and-tackle rope 53, the supporting body 50 and with it the scraper boom 24 supported by the rollers 56 and the supporting frame 57 can be raised and lowered. It will be appreciated that this arrangement provides for the frame 57 to run on the rollers 56. The supporting frame 57 and the beam like shanks 58 form a connecting carrier which can be raised and lowered together with the scraper boom 24. It would also be possible to omit the shanks 58 and to arrange a supporting extension on the free head end of the scraper boom 24. For instance, an extension in the form of the frame 57 would extend from the scraper boom and rest on the center guide of the center post 17 or the supporting body 50. A separate connecting beam as provided in the embodiment of FIGS. 1 to 5 is therefore not required. The mode of operation of the device depicted in FIGS. 6 and 7 corresponds in every other respect to the mode of operation of the previously described clearing devices.

It will be noted that in the embodiment of FIGS. 6 and 7 the base carriage 20 is additionally guided and supported by means of backing rollers 60 in an upper guide rail 61.

Having thus described my invention, I claim:

1. A device for the removal of bulk material from an annular pile through an opening in a support surface beneath the pile and generally in the center thereof comprising, inclined scraper means having lower and upper ends, means supporting said scraper means for rotation about the outer circumferential surface of said pile, said supporting means including center guide means supported above said opening and having an axis generally in alignment with the axis of said opening, circular guide means surrounding said pile on said support surface and generally concentric with the axis of said opening, beam means having a lower end supported by and movable along said circular guide means and an upper end engaged with said center guide means for rotation about the axis thereof, said scraper means including means to engage and displace material in the pile upwardly in the direction from said lower end toward said upper end of said scraper means, means supporting said lower end of said scraper means for pivotal movement of said scraper means in a vertical plane relative to said support surface, and means to pivot said scraper means in said vertical plane.

2. The device according to claim 1, wherein said center guide means includes a center post extending generally vertically from said opening and means connected to said post at a point spaced from said opening to support said upper end of said beam means for rotation about said post.

3. A device for the removal of bulk material from an annular pile through an opening in a support surface beneath the pile and generally in the center thereof comprising, inclined scraper means having lower and upper ends, means supporting said scraper means for rotation about the outer circumferential surface of said pile, said scraper means including means to engage and displace material in the pile upwardly in the direction from said lower end toward said upper end, means supporting said lower end of said scraper means for pivotal movement of said scraper means in a vertical plane relative to said support surface, and means to pivot said scraper means in said vertical plane, said means supporting said scraper means for rotation including center guide means supported above said opening and having an axis generally in alignment with the axis of said opening, circular guide rail means on said support surface and generally concentric with the axis of said opening, and beam means having a lower end slidable along said guide rail means and an upper end engaged with said center guide means for rotation about the axis thereof, and said center guide means including a guide member supported in suspension above said opening, said guide member including means supporting said upper end of said beam means for rotation about said guide member.

4. The device according to claim 3, wherein said guide member is tubular and has an axis generally in alignment with the axis of said opening.

5. A device for the removal of bulk material from an annular pile through an opening in a support surface beneath the pile and generally in the center thereof comprising, inclined scraper means having lower and upper ends, means supporting said scraper means for rotation about the outer circumferential surface of said pile, said scraper means including means to engage and displace material in the pile upwardly in the direction from said lower end toward said upper end, means supporting said lower end of said scraper means for pivotal movement of said scraper means in a vertical plane relative to said support surface, and means to pivot said scraper means in said vertical plane, said means supporting said scraper means for rotation including center guide means supported above said opening and having an axis generally in alignment with the axis of said opening, circular guide rail means on said support surface and generally concentric with the axis of said opening, and beam means having a lower end slidable along said guide rail means and an upper end engaged with said center guide means for rotation about the axis thereof, said lower end of said beam means including base carriage means in riding engagement with said guide rail means, said means pivotally supporting said lower end of said scraper means including means interconnecting said lower end of said beam means and said base carriage means for pivotal movement of said beam means in a vertical plane, said upper end of said scraper means being interconnected with said beam means for movement of said scraper means with said beam means, said center guide means including a guide member vertically displaceable to pivot said beam means, and means to displace said guide member.

6. A device for the removal of bulk material from an annular pile through an opening in a support surface beneath the pile and generally in the center thereof comprising, inclined scraper means having lower and upper ends, means supporting said scraper means for rotation about the outer circumferential surface of said pile, said scraper means including means to engage and displace material in the pile upwardly in the direction from said lower end toward said upper end, means supporting said lower end of said scraper means for pivotal movement of said scraper means in a vertical plane relative to said support surface, and means to pivot said scraper means in said vertical plane, said means supporting said scraper means for rotation including center guide means supported above said opening and having an axis generally in alignment with the axis of said opening, circular guide rail means on said support surface and generally concentric with the axis of said opening, and beam means having a lower end slidable along said guide rail means and an upper end engaged with said center guide means for rotation about the axis thereof, said center guide means including a center post extending generally vertically from said opening and means connected to said post at a point spaced from said opening to support said upper end of said beam means for rotation about said post, and said scraper means including guide means extending from said upper end thereof and along diametrically opposite sides of said center post.

7. The device according to claim 5, wherein said upper end of said beam means includes guide means disposed on diametrically opposed sides of said guide member, said guide member including means slidably supporting said guide means on said beam means.

8. The device according to claim 7, wherein said center guide means includes a center post extending generally vertically from said opening, said guide member encircling said post and being vertically displacable therealong.

9. The device according to claim 7, wherein said means slidably supporting said guide means on said beam means are rollers on said guide member.

10. The device according to claim 9, wherein said guide member includes first and second portions and means interconnecting said first and second portions for relative rotation, said rollers being mounted on one of said portions and said means to displace said guide member being connected to the other of said portions.

11. The device according to claim 10, wherein said center guide means includes a vertical center post, said portions of said guide member encircling said post with said other portion disposed above said one portion, said means to displace said guide member including an elevating mechanism supported above said other portion and operatively interconnected therewith.

12. The device according to claim 1, wherein said scraper means includes two parallel scraper booms positioned on circumferentially opposite sides of said beam means.

13. The device according to claim 12, wherein said means supporting said lower end of said scraper means for pivotal movement of said scraper means and said means to pivot said scraper means are operable to provide for independent pivotal movement of each of said scraper booms in a corresponding vertical plane.

* * * * *